US008032702B2

(12) United States Patent
Grimes et al.

(10) Patent No.: US 8,032,702 B2
(45) Date of Patent: Oct. 4, 2011

(54) DISK STORAGE MANAGEMENT OF A TAPE LIBRARY WITH DATA BACKUP AND RECOVERY (75) Inventors: Andrew W. Grimes, Tucson, AZ (US); Nikhil Khandelwal, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/753,451

(22) Filed: May 24, 2007

(65) Prior Publication Data

US 2008/0294857 A1    Nov. 27, 2008

(51) Int. Cl.
*G06F 12/16*    (2006.01)
(52) U.S. Cl. . 711/114; 711/156; 711/162; 711/E12.103; 714/6.32
(58) Field of Classification Search .................. None
See application file for complete search history.

(56) References Cited

U.S. PATENT DOCUMENTS

| 5,926,836 | A | | 7/1999 | Blumenau |
|---|---|---|---|---|
| 6,047,294 | A | * | 4/2000 | Deshayes et al. ............. 707/204 |
| 6,343,324 | B1 | * | 1/2002 | Hubis et al. ................... 709/229 |
| 6,446,175 | B1 | * | 9/2002 | West et al. .................... 711/162 |
| 6,543,004 | B1 | * | 4/2003 | Cagle et al. ..................... 714/15 |
| 6,549,992 | B1 | | 4/2003 | Armangau et al. |
| 6,785,786 | B1 | | 8/2004 | Gold et al. |
| 6,820,214 | B1 | * | 11/2004 | Cabrera et al. .................. 714/15 |
| 7,024,527 | B1 | | 4/2006 | Ohr |
| 7,310,704 | B1 | * | 12/2007 | Wen et al. ...................... 711/114 |
| 7,565,517 | B1 | * | 7/2009 | Arbon ................................ 713/1 |
| 7,680,957 | B1 | * | 3/2010 | Ketterhagen et al. ......... 709/246 |
| 2004/0139128 | A1 | | 7/2004 | Becker et al. |
| 2005/0010733 | A1 | * | 1/2005 | Mimatsu et al. ............... 711/162 |
| 2005/0055396 | A1 | | 3/2005 | Bello et al. |
| 2005/0066116 | A1 | | 3/2005 | Bello et al. |
| 2005/0081077 | A1 | | 4/2005 | Luciani et al. |
| 2005/0160305 | A1 | * | 7/2005 | Soejima ............................ 714/2 |
| 2005/0193239 | A1 | | 9/2005 | Shackelford |

(Continued)

FOREIGN PATENT DOCUMENTS

EP    1 400 899    3/2004

(Continued)

OTHER PUBLICATIONS

Preston, W. Curtis. "Unix Backup and Recovery." 1999. O'Reilly. pp. 323-332.*

(Continued)

*Primary Examiner* — Reginald Bragdon
*Assistant Examiner* — Nathan Sadler
(74) *Attorney, Agent, or Firm* — Rabindranath Dutta; Konrad Raynes and Victor LLP (57) ABSTRACT Provided are a method, system, and article of manufacture wherein configuration information for a first plurality of storage devices is sent to be stored on at least one removable storage media of a removable storage media library. Data corresponding to the first plurality of storage devices is sent to be stored in the removable storage media library. A first plurality of storage devices is replaced by a second plurality of storage devices. The second plurality of storage devices is configured from the configuration information stored in the at least one removable storage media of the removable storage media library, in response to replacing the first plurality of storage devices. The stored data is copied from the removable storage media library to the second plurality of storage devices, in response to configuring the second plurality of storage devices.

28 Claims, 5 Drawing Sheets

U.S. PATENT DOCUMENTS

| | | | |
|---|---|---|---|
| 2005/0210314 A1* | 9/2005 | Iguchi | 714/5 |
| 2005/0262296 A1 | 11/2005 | Peake | |
| 2006/0015696 A1 | 1/2006 | Nguyen et al. | |
| 2007/0050526 A1* | 3/2007 | Abe et al. | 710/68 |
| 2007/0174673 A1* | 7/2007 | Kawaguchi et al. | 714/6 |
| 2007/0180168 A1* | 8/2007 | Chikusa et al. | 710/74 |
| 2007/0220308 A1* | 9/2007 | Yeung et al. | 714/5 |

FOREIGN PATENT DOCUMENTS

JP      2003316526 A * 11/2003

OTHER PUBLICATIONS

M. Drakard. "Dynamic storage infrastructure." Jul. 2005. Springer. vol. 23. No. 3. pp. 59-64.*

English abstract of JP 2003316526 A.*

Robert C. Abraham. "Tape Automation Extends Its 5-Year Run." Mar. 2005. West World Productions. Computer Technology Review. vol. 25. No. 3. pp. 1, 22-23.*

Hitachi Data Systems Technical Marketing. "Best Practices Library." Mar. 2007. Hitachi Data Systems.*

Kimberly Keeton, Cipriano Santos, Dirk Beyer, Jeffrey Chase, and John Wilkes. "Designing for disasters." Apr. 2004. USENIX. FAST 2004.*

English abstract of JP 2003316526 A. 2004.*

PCT International Search Report & Written Opinion dated Aug. 18, 2008 for Application No. PCT/EP2008/055358 filed Apr. 30, 2008.

* cited by examiner

DISK STORAGE MANAGEMENT OF A TAPE LIBRARY WITH DATA BACKUP AND RECOVERY

BACKGROUND

1. Field

The disclosure relates to a method, system, and article of manufacture for disk storage management of a tape library with data backup and recovery.

2. Background

Data in storage systems may be stored in physical storage media, such as tapes or disks. Tape based systems may offer significantly larger storage capacity in comparison to disk based systems. However tape based systems have slower access times and data availability. Disk based systems offer faster access times, but have a significantly lesser storage capacity in comparison to tape based systems, and require high power levels to maintain data availability. While certain tape system based systems use disks to simulate tape functions, the operations of such tape based systems may be limited to many of the architectural limitations of tape based systems.

SUMMARY OF THE PREFERRED EMBODIMENTS

Provided are a method, system, and article of manufacture wherein configuration information for a first plurality of storage devices is sent to be stored on at least one removable storage media of a removable storage media library. Data corresponding to the first plurality of storage devices is sent to be stored in the removable storage media library. A first plurality of storage devices is replaced by a second plurality of storage devices. The second plurality of storage devices is configured from the configuration information stored in the at least one removable storage media of the removable storage media library, in response to replacing the first plurality of storage devices. The stored data is copied from the removable storage media library to the second plurality of storage devices, in response to configuring the second plurality of storage devices.

In additional embodiments, the first plurality of storage devices is comprised of a first plurality of disks, wherein the second plurality of storage devices is comprised of a second plurality of disks, wherein the removable storage media is comprised of a tape, and wherein the removable storage media library is comprised of a tape library.

In yet additional embodiments, the first plurality of storage devices is maintained in a storage subsystem, wherein the stored configuration information includes a host mapping, an Internet Protocol configuration, a copy service relationship, and at least one file system, wherein the stored configuration information on the at least one removable storage media of the removable storage media library and the stored data in the removable storage media library together include all information needed to recreate the storage subsystem. At least one file system is created on the second plurality of storage devices from the stored configuration information. The stored data is restored into the at least one file system.

In further embodiments, the first plurality of storage devices is maintained in a storage subsystem that includes a storage controller, wherein microcode is included in the storage controller, wherein the maintaining of the removable storage media library, the storing of the configuration information, the storing of the data, the configuring of the second plurality of storage devices, and the copying of the stored data are performed by an application implemented in the microcode.

In yet further embodiments, the first plurality of storage devices is maintained by a primary storage controller coupled to a primary storage subsystem, wherein the removable storage media library is a primary removable storage media library, wherein a secondary storage subsystem having a secondary storage controller is coupled for communication with the primary storage subsystem, wherein a secondary removable storage media library is coupled to the secondary storage subsystem, wherein the data is replicated between the primary storage subsystem and the secondary storage subsystem and onto the primary removable storage media library and the secondary removable storage media library. The second plurality of storage devices of the primary storage subsystem is configured for communication with the secondary storage subsystem over the network, in response to replacing the first plurality of storage devices of the primary storage subsystem.

In additional embodiments, the at least one removable storage media is a single master removable storage media of the removable storage media library, where the single master removable storage media of the removable storage media library stores the configuration information, wherein the second plurality of storage devices comprises replacement storage devices for the first plurality of storage devices, and wherein the replacement storage devices do not initially include the data or the configuration information.

In still additional embodiments, the configuration information stored on the single master removable storage media comprises a total configuration information for an entirety of a storage subsystem with location codes to storage data locations as stored in the removable storage media library for restoration purposes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow the creation of a "master tape" in a tape library, where the master tape includes all of the configuration data from a disk subsystem that is coupled to the tape library. The master tape is used to rebuild the disks of the disk subsystem including all host mappings, Internet Protocol (IP) configurations, copy service relationships, password and security information, file systems, and all other unique configuration information, and to restore the data directly into the file systems. Certain embodiments also include a mechanism for using copy service channels between a plurality of disk subsystems to backup data and to restore data from tape. Certain embodiments utilize the master tape and copy service facility to achieve redundancy.

Certain embodiments allow the usage of tape data storage for long term data storage of data managed in disk subsystem. Certain embodiments allow backup of disk storage data directly to a tape library without an intervening host or alternate control system. Certain additional embodiments allow the reduction of disk usage for long term storage of data, and enables open ended data capacity to be managed from one or more disk controllers with persistent lower cost tape storage.

Exemplary Embodiments

While the exemplary embodiments are described with reference to disks and tapes, in certain embodiments other exemplary storage devices besides disks may be used, and other removable storage media besides tapes may be used. For example, instead of disks other storage devices, such as those based on Non-volatile Random Access (NVRAM) technology may be used. Additionally, instead of tapes other removable storage media, such as optical technology based storage media (e.g., CD/DVD ROM) may be used.

Figure 1:
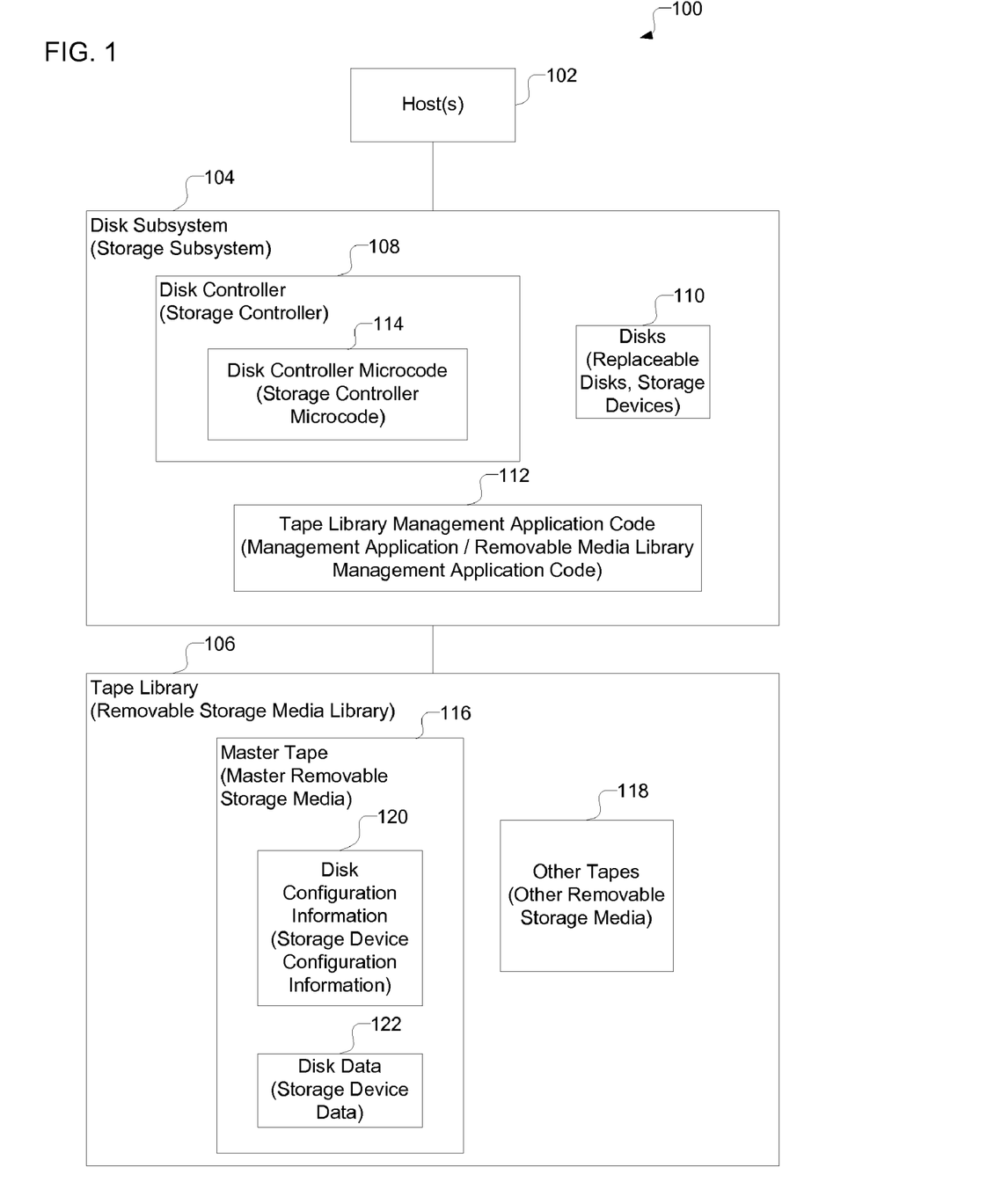
FIG. 1 illustrates a block diagram of a first computing environment, in accordance with certain embodiments.

FIG. 1 illustrates a block diagram of a first computing environment 100, in accordance with certain embodiments. One or more hosts 102 are coupled to a disk subsystem 104 that is coupled to a tape library 106. The disk subsystem 104 is connected directly or through a storage area network to the tape library 106. The disk subsystem 104 is a an exemplary storage subsystem and the tape library 106 is an exemplary removable storage media library.

The one or more hosts 102 may comprise any suitable computational device known in the art, such as a personal computer, a workstation, a server, a mainframe, a hand held computer, a palm top computer, a telephony device, a network appliance, etc. The disk subsystem 104 may comprise any suitable disk subsystem known in the art, and may be comprised of a disk controller 108, one or more disks 110, and application code 112 for managing the tape library 106. The disk controller 108 is an exemplary storage controller.

The disk controller 108 may include microcode, i.e., firmware, also referred to as disk controller microcode 114. In certain embodiments, the one or more disks 110 may comprise replaceable disks, i.e., the one or more disks 110 may be physically replaced by a user, an administrator, or via automated means. The application code 112 for managing the tape library 106 may also be referred to as a management application 112. In certain embodiments, the management application 112 can run in a logical partition controlled by the disk controller 108. However, the management application 112 need not directly interact with the disk controller 108. The management application 112 may be implemented in software, hardware, firmware, or any combination thereof. In certain alternative embodiments, the management application 112 may execute on the hardware of the disk subsystem 104, and may be implemented in the disk controller microcode 114.

The tape library 106 may comprise any suitable tape library known in the art, and may be comprised of a plurality of tapes, wherein at least one tape is referred to as a master tape 116. Tapes other than the master tape 116 included in the plurality of tapes are referred to as "other" tapes 118. In certain embodiments, the master tape 116 may include disk configuration information 120 and disk data 122. In alternative embodiments the tapes may comprise any removable storage media, including magnetic tapes, optical technology based storage media, etc.

The disk configuration information 120 stores the configuration information for the one or more disks 112 included in the disk subsystem 104. The disk data 122 comprises data that is stored in the one or more disks 110. In certain embodiments the disk configuration information 120 includes a host mapping, an Internet Protocol configuration, a copy service relationship, password and security information, and all other unique configuration information, and at least one file system, wherein the disk configuration information 120 on the master tape 116 of the tape library 106 and the disk data 122 in the tape library 106 together include all information needed to recreate the disk subsystem 104.

In certain embodiments, the disks 110 on the disk subsystem 104 comprise a first plurality of disks, and the first plurality of disks of the disk subsystem 110 is replaced by a second plurality of disks. The replacement of the first plurality of disks by the second plurality of disks may be performed by a user, an administrator, or via automated means. The replacement of the first plurality of disks by the second plurality of disks may be performed because of various reasons, including errors being generated by the first plurality of disks, defects in the first plurality of disks, damage to the first plurality of disks, substitute disks, upgraded disks, replacement of customer disks, etc.

In certain embodiments, the second plurality of disks is configured from the disk configuration information 120 stored in the master tape 116 of the tape library 106, in response to replacing the first plurality of disks. The stored data for the first plurality of disks is copied from the tape library 106 to the second plurality of disks, in response to configuring the second plurality of disks. In certain embodiments, at least one file system is created on the second plurality of disks from the disk configuration information 120, and the disk data 122 is used to restore data into the at least one file system.

Figure 2:
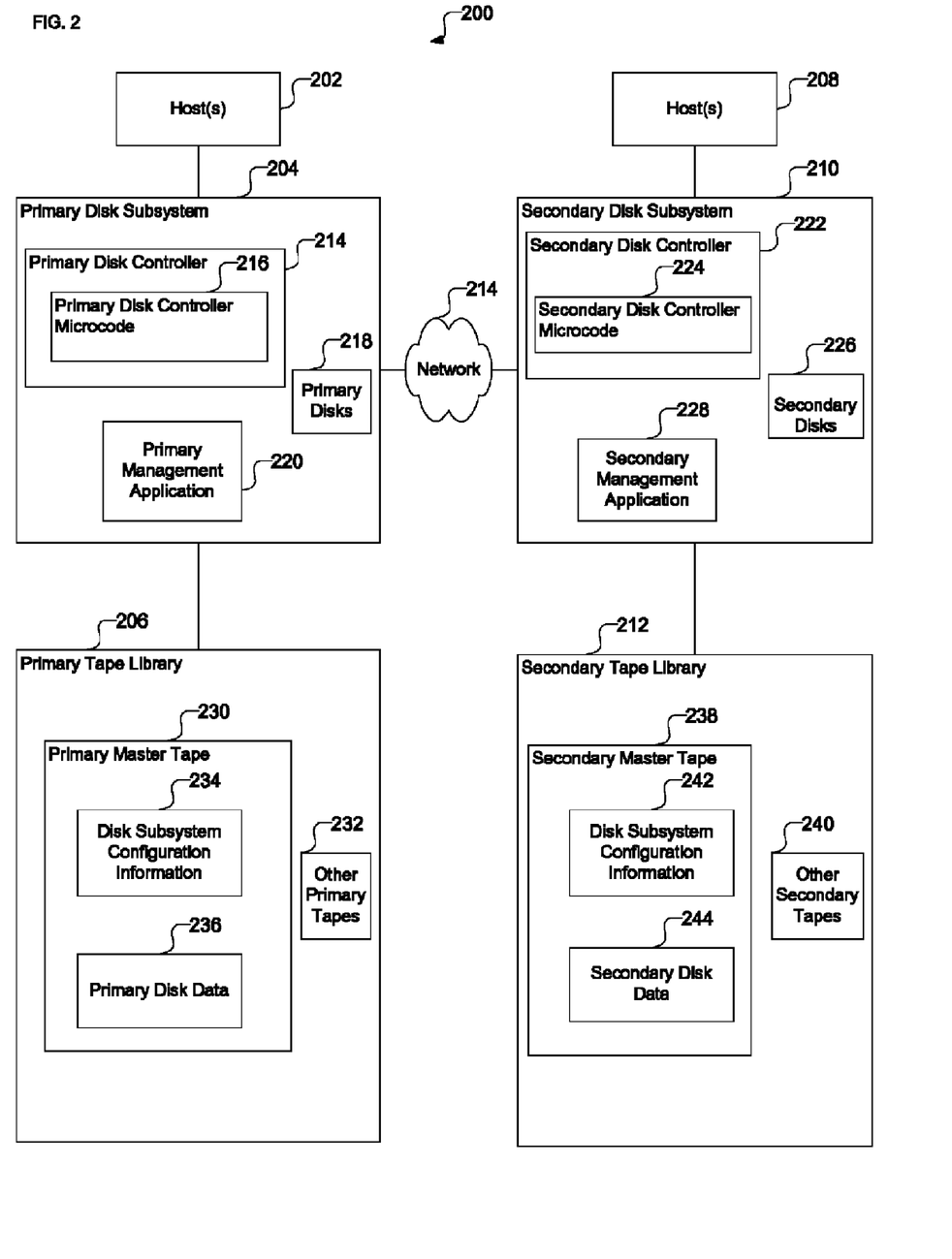
FIG. 2 illustrates a block diagram of a second computing environment, in accordance with certain embodiments.

FIG. 2 illustrates a block diagram of a second computing environment 200, in accordance with certain embodiments. One or more hosts 202 are coupled to a primary disk subsystem 204 that is coupled to a primary tape library 206. Additionally, one or more hosts 208 are coupled to a secondary disk subsystem 210 that is coupled to a secondary tape library 212. The primary disk subsystem 204 is coupled to the secondary disk subsystem 210 over a network 214.

In certain embodiment, the primary disk subsystem 204 comprises a primary disk controller 214 having primary disk controller microcode 216, one or more primary disks 218, and a primary management application 220. The secondary disk subsystem 204 comprises a secondary disk controller 222 having secondary disk controller microcode 224, one or more secondary disks 226, and a secondary management application 228. The primary tape library 206 may comprise a primary master tape 230 and other primary tapes 232, wherein the primary master tape 230 includes configuration information 234 for the primary disk subsystem 204 and primary disk data 236, i.e., data that is stored on the primary disks 218 of the primary disk subsystem 204. The secondary tape library 212 may comprise a secondary master tape 238 and other secondary tapes 240, wherein the secondary master tape 238 includes configuration information 242 for the secondary disk subsystem 204 and secondary disk data 244, i.e., data that is stored on the secondary disks 226 of the secondary disk subsystem 210.

In certain embodiments, the data stored on the primary disk subsystem 204 is replicated between the primary disk subsystem 204 and the secondary disk subsystem 210 and onto the primary tape library 206 and the secondary tape library 212. In certain embodiments, the primary disks 218 on the primary disk subsystem 204 comprise a first plurality of disks, and the first plurality of disks of the primary disk subsystem 204 is replaced by a second plurality of disks. The second plurality of disks of the primary disk subsystem is configured for communication with the secondary disk subsystem over the network, in response to replacing the first plurality of disks of the primary disk subsystem 204.

Figure 3:
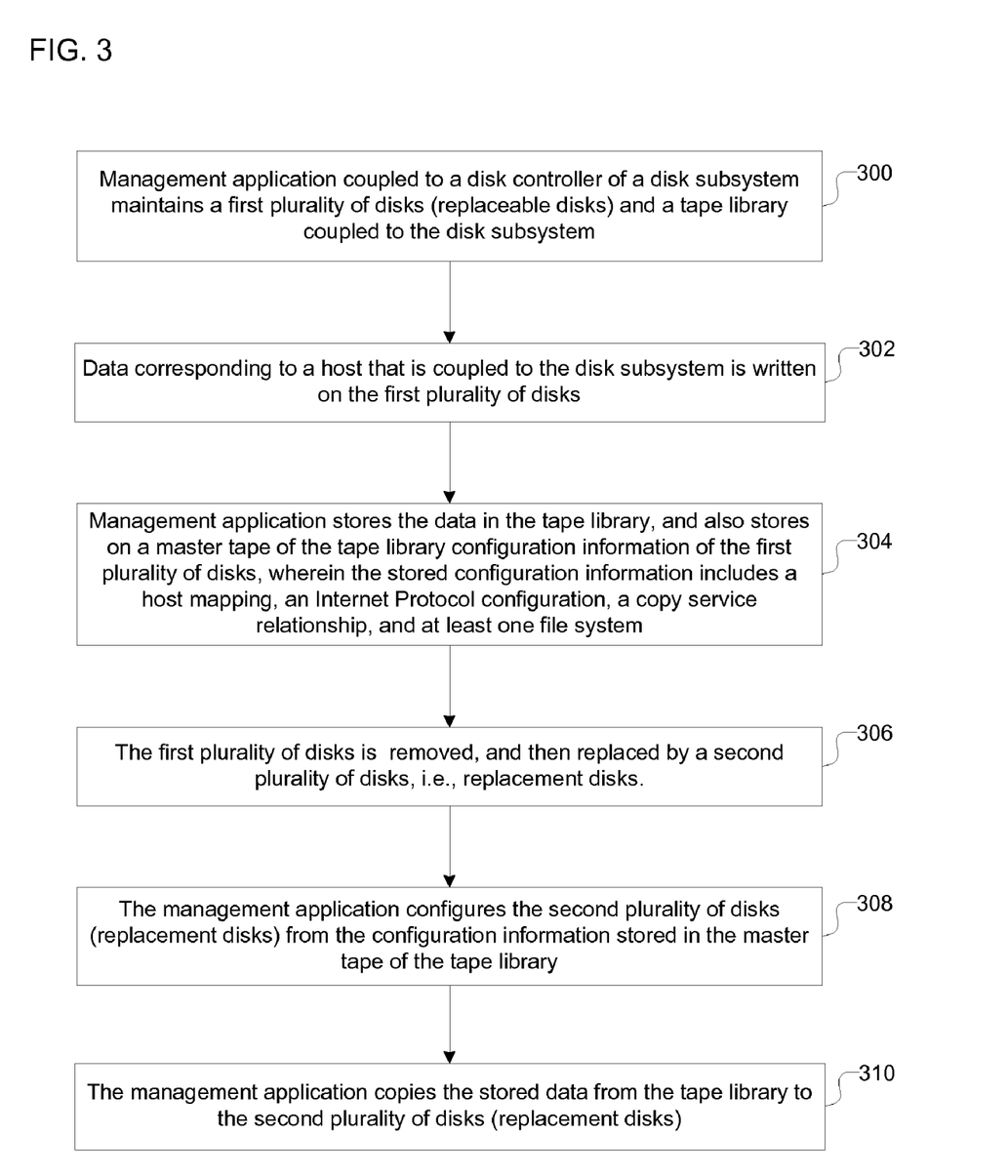
FIG. 3 illustrates operations implemented in the first computing environment, in accordance with certain embodiments.

FIG. 3 illustrates operations implemented in the first computing environment 100, in accordance with certain embodiments. Certain of the operations illustrated in FIG. 3 may be implemented by the management application 112 implemented in the disk subsystem 104 of the computing environment 100.

Control starts at block 300, where the management application 112 coupled to the disk controller 108 of the disk subsystem 104 maintains a first plurality of disks 110, also referred to as replaceable disks, and a tape library 106 coupled to the disk subsystem 104. Data corresponding to a host 102 that is coupled to the disk subsystem 104 is written (at block 302) on the first plurality of disks 110. The data written on the first plurality of disks 110 may comprise data written by the host 102.

The management application 112 stores (at block 304) the data in the tape library 106 in the data structure referred to as disk data 122, and also stores on the master tape 116 of the tape library 106 the configuration information of the first plurality of disks 110, wherein the stored configuration information includes a host mapping, an Internet Protocol configuration, password and security information, a copy service relationship, and at least one file system, and all other unique configuration information.

After a certain interval of time, at block 306, the first plurality of disks 110 is removed, and then replaced by a second plurality of disks, i.e., replacement disks. For example, a user, an administrator or an automated system may replace the first plurality of disks by the second plurality of disks.

The management application 112 configures (at block 308) the second plurality of disks (replacement disks) from the disk configuration information 120 stored in the master tape 116 of the tape library 106. The management application 112 then copies (at block 310) the stored data 122 from the tape library 106 to the second plurality of disks, i.e., the replacement disks.

Therefore, FIG. 3 illustrates certain embodiments in which at least one tape stored in the tape library 106 is a single master tape 116 of the tape library 106, where the single master tape 116 of the tape library 106 stores the configuration information needed to perform data restoration on replacement disks that do not initially include the data or the configuration information. In certain embodiments, the configuration information 120 stored on the single master tape 116 comprises the total configuration information for the entirety of the disk subsystem 104 with location codes to disk data locations as stored in the tape library 106 for restoration purposes.

Figure 4:
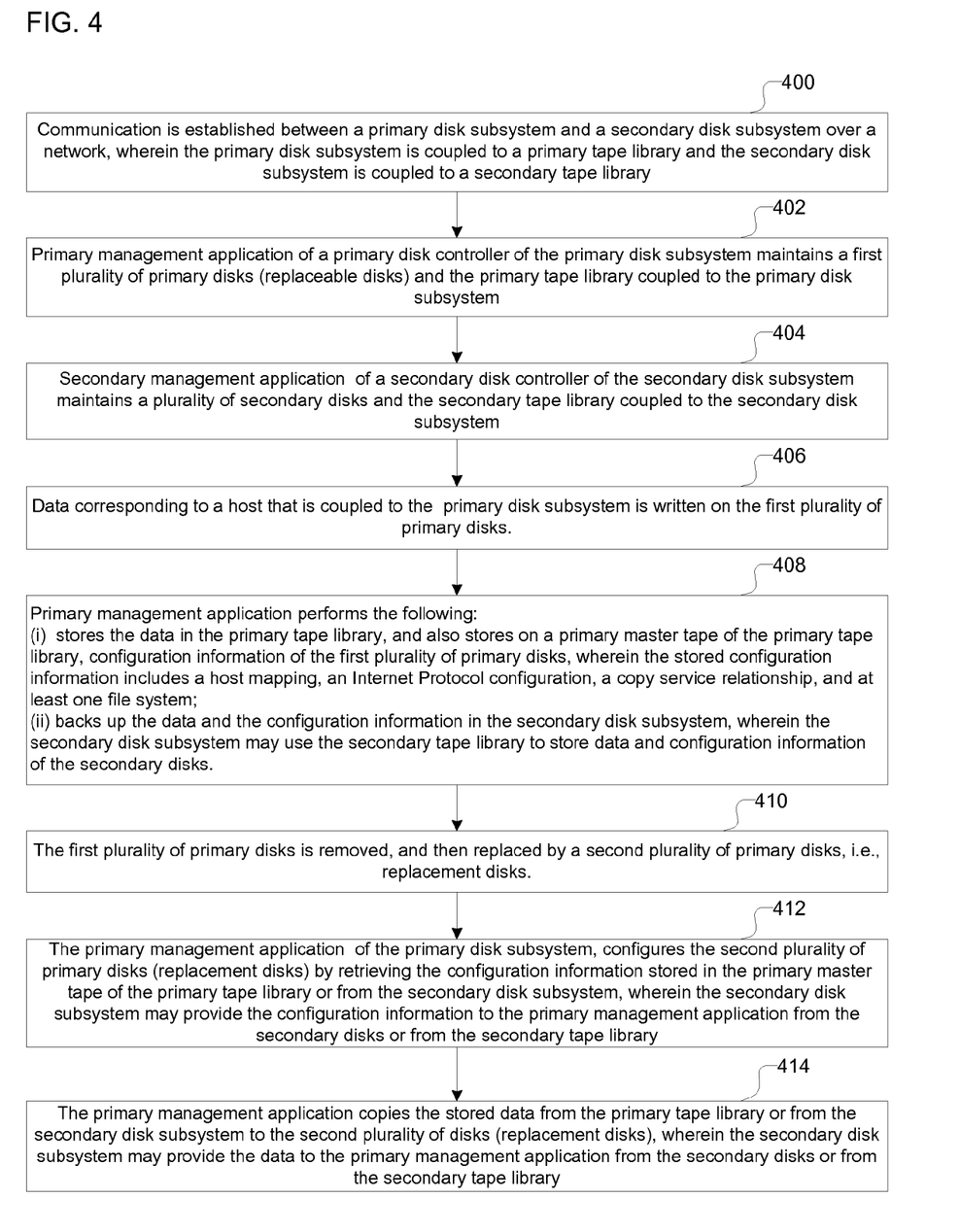
FIG. 4 illustrates operations implemented in the second computing environment, in accordance with certain embodiments.

FIG. 4 illustrates operations implemented in the second computing environment 200, in accordance with certain embodiments. Certain operations illustrated in FIG. 4 may be implemented by the primary management application 220 implemented in the primary disk subsystem 204. Certain other operations illustrated in FIG. 4 may be implemented by the secondary management application 228 implemented in the secondary disk subsystem 210.

Control starts at block 400, in which communication is established between the primary disk subsystem 204 and the secondary disk subsystem 210 over the network 214, wherein the primary disk subsystem 204 is coupled to the primary tape library 206 and the secondary disk subsystem 210 is coupled to the secondary tape library 212.

The primary management application 220 coupled to the primary disk controller 214 of the primary disk subsystem 204 maintains (at block 402) a first plurality of primary disks 218, also referred to as replaceable disks, and the primary tape library 206 coupled to the primary disk subsystem 204.

The secondary management application 228 coupled to the secondary disk controller 222 of the secondary disk subsystem 210 maintains (at block 404) a plurality of secondary disks 226 and the secondary tape library 212 coupled to the secondary disk subsystem 210. Data corresponding to a host 202 that is coupled to the primary disk subsystem 204 is written (at block 406) on the first plurality of primary disks 218.

Control proceeds to block 408, in which the primary management application 220 performs the following:
(i) stores the data in the primary tape library 206, and also stores on a primary master tape 230 of the primary tape library 206, configuration information 234 of the first plurality of primary disks 218, wherein the stored configuration information 234 includes a host mapping, an Internet Protocol configuration, a copy service relationship, password and security information, at least one file system, and all other unique configuration information; and
(ii) backs up the data and the configuration information in the secondary disk subsystem 210, wherein the secondary disk subsystem 210 may use the secondary tape library 212 to store data and configuration information of the secondary disks 226.

The first plurality of primary disks 218 is removed (at block 410), and then replaced by a second plurality of primary disks, i.e., replacement disks. The primary management application 220 of the primary disk subsystem 204, configures (at block 412) the second plurality of primary disks (replacement disks) by retrieving the configuration information 234 stored in the primary master tape 230 of the primary tape library 206 or from the secondary disk subsystem 210, wherein the secondary disk subsystem 210 may provide the configuration information to the primary management application 220 from the secondary disks 226 or from the secondary tape library 212 in which the configuration information 242 is stored.

The primary management application 220 copies (at block 414) the stored data from the primary tape library 206 or from the secondary disk subsystem 210 to the second plurality of disks (replacement disks), wherein the secondary disk subsystem 210 may provide the data to the primary management application 220 from the secondary disks 226 or from the secondary tape library 212 in which the secondary disk data 244 is stored.

Therefore, FIG. 4 illustrates certain embodiments in which a secondary disk subsystem 210 having a secondary disk controller 222 is coupled for synchronous or asynchronous or other types of communication with a primary disk subsystem 204 over a network 214, wherein a secondary tape library 212 is coupled to the secondary disk subsystem 210, and wherein data is replicated between the primary disk subsystem 204 and the secondary disk subsystem 210 and onto the primary tape library 206 coupled to the primary disk subsystem 204 and the secondary tape library 212 coupled to the secondary disk subsystem 210. In certain embodiments, replacement disks of the primary disk subsystem 204 are configured for communication with the secondary disk subsystem 210 over the network 214, in response to replacing disks of the primary disk subsystem 204.

Certain embodiments, allow the usage of the disk storage subsystem functions to support host attachment to combine the benefits of high speed disk data access capabilities with the cost and stability benefits of long term storage of data on tape. The storage subsystem functions from the disk controller microcode may be used to manage the tape inventory and library functions rather than use disks to emulate a tape controller/tape library storage scheme to simulate tape functions. Certain embodiments allow disk management in combination with tape backup and may use disk controller functions in conjunction with tape library capabilities.

Certain embodiments, allow the restoration of data directly into the disk subsystem from one or more locations substantially simultaneously without using host intervention to resume operation. In certain embodiments, a highly redundant disk system may create static "safe" restore points volume by volume at multiple locations without user intervention that are to be found on static tape machines. Certain additional embodiments allow the movement of tapes from one disk storage subsystem to another and allow the restoration of configuration for disk subsystems or tape libraries.

Certain embodiments may reduce the hardware requirements for tape/disk solutions for customers and reduce the utilization of disks for long term backup to cause a reduction in ownership costs. Such embodiments may also present a number of redundancy options for storage solutions.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
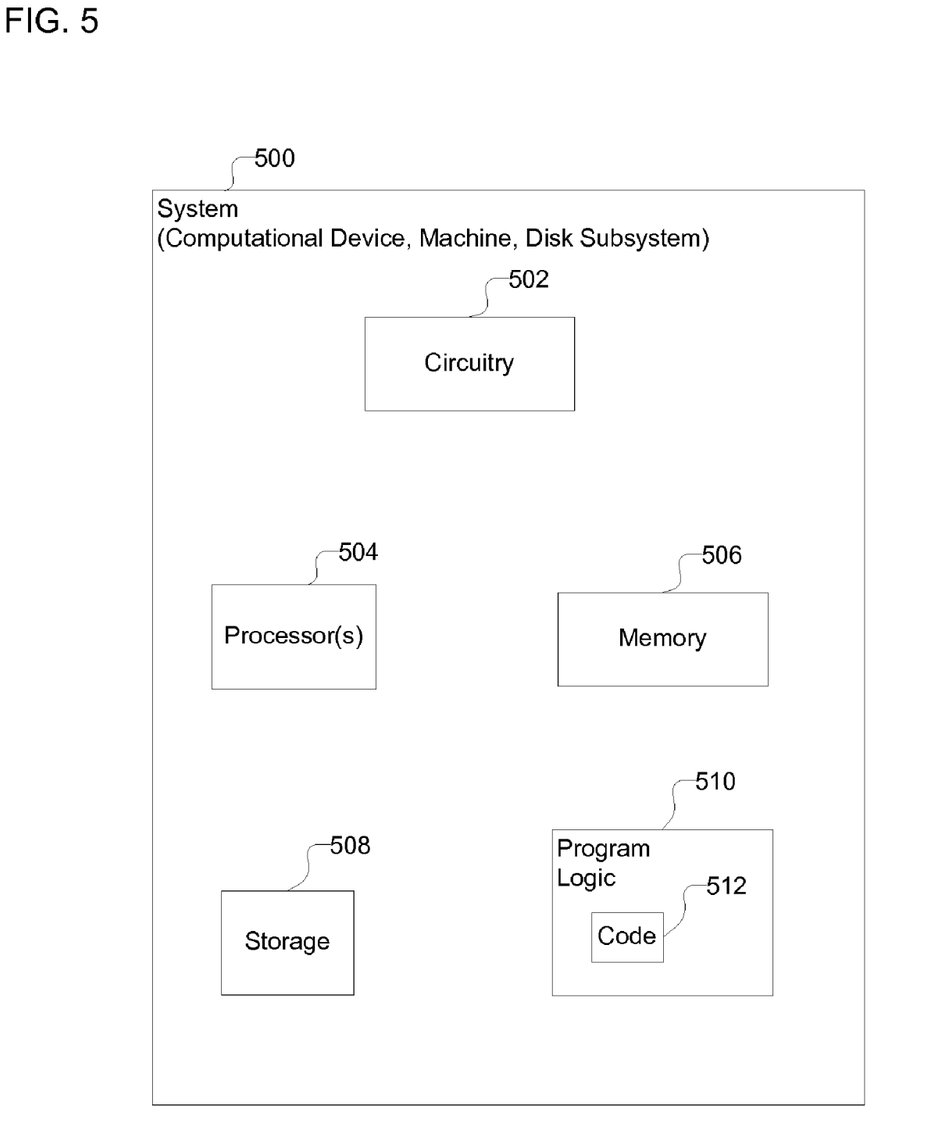
FIG. 5 illustrates a block diagram of a computer architecture in which certain described aspects of the embodiments are implemented.

FIG. 5 illustrates the architecture of computing system 500, wherein in certain embodiments the hosts 102, 202, 204 and the disk subsystem 104, 204, 210 of the computing environments 100, 200 of FIG. 1 and FIG. 2 may be implemented in accordance with the architecture of the computing system 500. The computing system 500 may also be referred to as a system, and may include a circuitry 502 that may in certain embodiments include a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A computer readable storage medium, wherein code stored in the computer readable storage medium when executed by a machine causes operations to be performed, the operations comprising:

maintaining a primary storage subsystem, a secondary storage subsystem, a primary tape library, and a secondary tape library, wherein the primary storage subsystem is coupled to the secondary storage subsystem, wherein the primary storage subsystem is coupled to the primary tape library, and wherein the secondary storage subsystem is coupled to the secondary tape library;

in response to maintaining the primary storage subsystem, the secondary storage subsystem, the primary tape library, and the secondary tape library, sending configuration information for a first plurality of storage devices of the primary storage subsystem to be stored on only a first tape of a first plurality of tapes of the primary tape library of the primary storage subsystem and on only a second tape of a second plurality of tapes of the secondary tape library of the secondary storage subsystem, wherein the configuration information includes a host mapping, an Internet Protocol configuration, a copy service relationship, password and security information, and at least one file system, wherein the first tape library and the second tape library include other storage media in addition to the first tape and the second tape;

in response to sending the configuration information, sending data corresponding to the first plurality of storage devices of the primary storage subsystem to be stored in the first tape of the primary tape library of the primary storage subsystem and in the second tape of the secondary tape library of the secondary storage subsystem;

subsequent to sending the data, replacing, in the primary storage subsystem, the first plurality of storage devices by a second plurality of storage devices to upgrade the first plurality of storage devices, wherein the first plurality of storage devices is a redundant disk system that creates a plurality of safe restore points volume by volume at a plurality of locations without user intervention;

storing code to execute a first set of operations that are executable to configure the second plurality of storage devices from the configuration information stored in the first tape of the primary tape library of the primary storage subsystem and to execute a second set of operations that are executable to configure the second plurality of storage devices from the configuration information stored in the second tape of the secondary tape library of the secondary storage subsystem;

in response to replacing the first plurality of storage devices in the primary storage subsystem, executing one of the first set of operations or the second set of operations to configure the second plurality of storage devices: (a) from the configuration information stored in the first tape of the primary tape library of the primary storage subsystem; or (b) from the configuration information stored in the second tape of the secondary tape library of the secondary storage subsystem; and in response to executing the second set of operations to configure the second plurality of storage devices, copying the stored data from the second tape of the secondary tape library of the secondary storage subsystem to the second plurality of storage devices of the primary storage subsystem via the secondary storage subsystem.

2. The computer readable storage medium of claim 1, wherein the first plurality of storage devices is comprised of a first plurality of disks, wherein the second plurality of storage devices is comprised of a second plurality of disks.

3. The computer readable storage medium of claim 1, wherein the stored configuration information on the second tape of the secondary tape library and the stored data in the secondary tape library together include all information needed to recreate the primary storage subsystem, and wherein the operations further comprise:

creating the at least one file system on the second plurality of storage devices from the stored configuration information on the second tape; and restoring the stored data into the at least one file system.

4. The computer readable storage medium of claim 1, wherein the primary storage subsystem includes a storage controller, wherein firmware is included in the storage controller, wherein the maintaining of the primary tape library, the storing of the configuration information, the storing of the data, the configuring of the second plurality of storage devices, and the copying of the stored data are performed by an application implemented in the firmware.

5. The computer readable storage medium of claim 1, wherein the second plurality of storage devices comprises replacement storage devices for the first plurality of storage devices, and wherein the replacement storage devices do not initially include the data or the configuration information.

6. The computer readable storage medium of claim 5, wherein the configuration information stored on the first tape and the second tape comprises a total configuration information for an entirety of the primary storage subsystem with location codes to storage data locations as stored in the first tape library and the second tape library for restoration purposes.

7. The computer readable storage medium of claim 1, wherein the replacing in the primary storage subsystem of the first plurality of storage devices by the second plurality of storage devices is performed in response to errors being generated by the first plurality of disks.

8. A method comprising:

maintaining a primary storage subsystem, a secondary storage subsystem, a primary tape library, and a secondary tape library, wherein the primary storage subsystem is coupled to the secondary storage subsystem, wherein the primary storage subsystem is coupled to the primary tape library, and wherein the secondary storage subsystem is coupled to the secondary tape library;

in response to maintaining the primary storage subsystem, the secondary storage subsystem, the primary tape library, and the secondary tape library, sending configuration information for a first plurality of storage devices of the primary storage subsystem to be stored on only a first tape of a first plurality of tapes of the primary tape library of the primary storage subsystem and on only a second tape of a second plurality of tapes of the secondary tape library of the secondary storage subsystem, wherein the configuration information includes a host mapping, an Internet Protocol configuration, a copy service relationship, password and security information, and at least one file system, wherein the first tape library and the second tape library include other storage media in addition to the first tape and the second tape;

in response to sending the configuration information, sending data corresponding to the first plurality of storage devices of the primary storage subsystem to be stored in the first tape of the primary tape library of the primary storage subsystem and in the second tape of the secondary tape library of the secondary storage subsystem;

subsequent to sending the data, replacing, in the primary storage subsystem, the first plurality of storage devices by a second plurality of storage devices to upgrade the first plurality of storage devices, wherein the first plurality of storage devices is a redundant disk system that creates a plurality of safe restore points volume by volume at a plurality of locations without user intervention;

storing code to execute a first set of operations that are executable to configure the second plurality of storage devices from the configuration information stored in the first tape of the primary tape library of the primary storage subsystem and to execute a second set of operations that are executable to configure the second plurality of storage devices from the configuration information stored in the second tape of the secondary tape library of the secondary storage subsystem;

in response to replacing the first plurality of storage devices in the primary storage subsystem, executing one of the first set of operations or the second set of operations to configure the second plurality of storage devices: (a) from the configuration information stored in the first tape of the primary tape library of the primary storage subsystem; or (b) from the configuration information stored in the second tape of the secondary tape library of the secondary storage subsystem; and in response to executing the second set of operations to configure the second plurality of storage devices, copying the stored data from the second tape of the secondary tape library of the secondary storage subsystem to the second plurality of storage devices of the primary storage subsystem via the secondary storage subsystem.

9. The method of claim 8, wherein the first plurality of storage devices is comprised of a first plurality of disks, wherein the second plurality of storage devices is comprised of a second plurality of disks.

10. The method of claim 8, wherein the stored configuration information on the second tape of the secondary tape library and the stored data in the secondary tape library together include all information needed to recreate the primary storage subsystem, and wherein the method further comprises:

creating the at least one file system on the second plurality of storage devices from the stored configuration information on the second tape; and restoring the stored data into the at least one file system.

11. The method of claim 8, wherein the primary storage subsystem includes a storage controller, wherein firmware is included in the storage controller, wherein the maintaining of the primary tape library, the storing of the configuration information, the storing of the data, the configuring of the second plurality of storage devices, and the copying of the stored data are performed by an application implemented in the firmware.

12. The method of claim 8, wherein the second plurality of storage devices comprises replacement storage devices for the first plurality of storage devices, and wherein the replacement storage devices do not initially include the data or the configuration information.

13. The method of claim 12, wherein the configuration information stored on the first tape and the second tape comprises a total configuration information for an entirety of the primary storage subsystem with location codes to storage data locations as stored in the first tape library and the second tape library for restoration purposes.

14. The method of claim 8, wherein the replacing in the primary storage subsystem of the first plurality of storage devices by the second plurality of storage devices is performed in response to errors being generated by the first plurality of disks.

15. A system, comprising:

a memory; and a processor coupled to the memory, wherein the processor performs operations, the operations comprising:

maintaining a primary storage subsystem, a secondary storage subsystem, a primary tape library, and a secondary tape library, wherein the primary storage subsystem is coupled to the secondary storage subsystem, wherein the primary storage subsystem is coupled to the primary tape library, and wherein the secondary storage subsystem is coupled to the secondary tape library;

in response to maintaining the primary storage subsystem, the secondary storage subsystem, the primary tape library, and the secondary tape library, sending configuration information for a first plurality of storage devices of the primary storage subsystem to be stored on only a first tape of a first plurality of tapes of the primary tape library of the primary storage subsystem and on only a second tape of a second plurality of tapes of the secondary tape library of the secondary storage subsystem, wherein the configuration information includes a host mapping, an Internet Protocol configuration, a copy service relationship, password and security information, and at least one file system, wherein the first tape library and the second tape library include other storage media in addition to the first tape and the second tape;

in response to sending the configuration information, sending data corresponding to the first plurality of storage devices of the primary storage subsystem to be stored in the first tape of the primary tape library of the primary storage subsystem and in the second tape of the secondary tape library of the secondary storage subsystem;

subsequent to sending the data, replacing, in the primary storage subsystem, the first plurality of storage devices by a second plurality of storage devices to upgrade the first plurality of storage devices, wherein the first plurality of storage devices is a redundant disk system that creates a plurality of safe restore points volume by volume at a plurality of locations without user intervention;

storing code to execute a first set of operations that are executable to configure the second plurality of storage devices from the configuration information stored in the first tape of the primary tape library of the primary storage subsystem and to execute a second set of operations that are executable to configure the second plurality of storage devices from the configuration information stored in the second tape of the secondary tape library of the secondary storage subsystem;

in response to replacing the first plurality of storage devices in the primary storage subsystem, executing one of the first set of operations or the second set of operations to configure the second plurality of storage devices: (a) from the configuration information stored in the first tape of the primary tape library of the primary storage subsystem; or (b) from the configuration information stored in the second tape of the secondary tape library of the secondary storage subsystem; and in response to executing the second set of operations to configure the second plurality of storage devices, copying the stored data from the second tape of the secondary tape library of the secondary storage subsystem to the second plurality of storage devices of the primary storage subsystem via the secondary storage subsystem.

16. The system of claim 15, wherein the first plurality of storage devices is comprised of a first plurality of disks, wherein the second plurality of storage devices is comprised of a second plurality of disks.

17. The system of claim 15, wherein the stored configuration information on the second tape of the secondary tape library and the stored data in the secondary tape library together include all information needed to recreate the primary storage subsystem, and wherein the operations further comprise:

creating the at least one file system on the second plurality of storage devices from the stored configuration information on the second tape; and restoring the stored data into the at least one file system.

18. The system of claim 15, wherein the primary storage subsystem includes a storage controller, the system further comprising:

firmware included in the storage controller, wherein the maintaining of the primary tape library, the storing of the configuration information, the storing of the data, the configuring of the second plurality of storage devices, and the copying of the stored data are performed by an application implemented in the firmware.

19. The system of claim 15, wherein the second plurality of storage devices comprises replacement storage devices for the first plurality of storage devices, and wherein the replacement storage devices do not initially include the data or the configuration information.

20. The system of claim 19, wherein the configuration information stored on the first tape and the second tape comprises a total configuration information for an entirety of the primary storage subsystem with location codes to storage data locations as stored in the first tape library and the second tape library for restoration purposes.

21. The system of claim 15, wherein the replacing in the primary storage subsystem of the first plurality of storage devices by the second plurality of storage devices is performed in response to errors being generated by the first plurality of disks.

22. A method for deploying computing infrastructure, comprising integrating computer-readable code into a computing system, wherein the code in combination with the computing system is capable of performing:

maintaining a primary storage subsystem, a secondary storage subsystem, a primary tape library, and a secondary tape library, wherein the primary storage subsystem is coupled to the secondary storage subsystem, wherein the primary storage subsystem is coupled to the primary tape library, and wherein the secondary storage subsystem is coupled to the secondary tape library;

in response to maintaining the primary storage subsystem, the secondary storage subsystem, the primary tape library, and the secondary tape library, sending configuration information for a first plurality of storage devices of the primary storage subsystem to be stored on only a first tape of a first plurality of tapes of the primary tape library of the primary storage subsystem and on only a second tape of a second plurality of tapes of the secondary tape library of the secondary storage subsystem, wherein the configuration information includes a host mapping, an Internet Protocol configuration, a copy service relationship, password and security information, and at least one file system, wherein the first tape library and the second tape library include other storage media in addition to the first tape and the second tape;

in response to sending the configuration information, sending data corresponding to the first plurality of storage devices of the primary storage subsystem to be stored in the first tape of the primary tape library of the primary storage subsystem and in the second tape of the secondary tape library of the secondary storage subsystem;

subsequent to sending the data, replacing, in the primary storage subsystem, the first plurality of storage devices by a second plurality of storage devices to upgrade the first plurality of storage devices, wherein the first plurality of storage devices is a redundant disk system that creates a plurality of safe restore points volume by volume at a plurality of locations without user intervention;

storing code to execute a first set of operations that are executable to configure the second plurality of storage devices from the configuration information stored in the first tape of the primary tape library of the primary storage subsystem and to execute a second set of operations that are executable to configure the second plurality of storage devices from the configuration information stored in the second tape of the secondary tape library of the secondary storage subsystem;

in response to replacing the first plurality of storage devices in the primary storage subsystem, executing one of the first set of operations or the second set of operations to configure the second plurality of storage devices: (a) from the configuration information stored in the first tape of the primary tape library of the primary storage subsystem; or (b) from the configuration information stored in the second tape of the secondary tape library of the secondary storage subsystem; and in response to executing the second set of operations to configure the second plurality of storage devices, copying the stored data from the second tape of the secondary tape library of the secondary storage subsystem to the second plurality of storage devices of the primary storage subsystem via the secondary storage subsystem.

23. The method for deploying computing infrastructure of claim 22, wherein the first plurality of storage devices is comprised of a first plurality of disks, wherein the second plurality of storage devices is comprised of a second plurality of disks.

24. The method for deploying computing infrastructure of claim 22, wherein the stored configuration information on the second tape of the secondary tape library and the stored data in the secondary tape library together include all information needed to recreate the primary storage subsystem, and wherein the code in combination with the computing system is further capable of performing:

creating the at least one file system on the second plurality of storage devices from the stored configuration information on the second tape; and restoring the stored data into the at least one file system.

25. The method for deploying computing infrastructure of claim 22, wherein the primary storage subsystem includes a storage controller, wherein firmware is included in the storage controller, wherein the maintaining of primary tape library, the storing of the configuration information, the storing of the data, the configuring of the second plurality of storage devices, and the copying of the stored data are performed by an application implemented in the firmware.

26. The method for deploying computing infrastructure of claim 22, wherein the second plurality of storage devices comprises replacement storage devices for the first plurality of storage devices, and wherein the replacement storage devices do not initially include the data or the configuration information.

27. The method for deploying computing infrastructure of claim 26, wherein the configuration information stored on the first tape and the second tape comprises a total configuration information for an entirety of the primary storage subsystem with location codes to storage data locations as stored in the first tape library and the second tape library for restoration purposes.

28. The method for deploying computing infrastructure of claim 22, wherein the replacing in the primary storage subsystem of the first plurality of storage devices by the second plurality of storage devices is performed in response to errors being generated by the first plurality of disks.

* * * * *